United States Patent
Hancock

(10) Patent No.: US 12,454,348 B2
(45) Date of Patent: Oct. 28, 2025

(54) AIRCRAFT LANDING GEAR

(71) Applicant: Airbus Operations Limited, Bristol (GB)

(72) Inventor: Nicholas Hancock, Bristol (GB)

(73) Assignee: Airbus Operations Limited, Filton Bristol (GB)

( * ) Notice: Subject to any disclaimer, the term of this patent is extended or adjusted under 35 U.S.C. 154(b) by 0 days.

(21) Appl. No.: 18/962,101

(22) Filed: Nov. 27, 2024

(65) Prior Publication Data

US 2025/0178719 A1    Jun. 5, 2025

(30) Foreign Application Priority Data

Nov. 30, 2023 (GB) ...................................... 2318286

(51) Int. Cl.
*B64C 25/34* (2006.01)
*B64C 25/58* (2006.01)

(52) U.S. Cl.
CPC .............. *B64C 25/34* (2013.01); *B64C 25/58* (2013.01)

(58) Field of Classification Search
CPC ................................ B64C 25/34; B64C 25/58
See application file for complete search history.

(56) References Cited

U.S. PATENT DOCUMENTS

| | | | |
|---|---|---|---|
| 2,732,152 A * | 1/1956 | Neilson et al. ......... | B64C 25/60 244/104 FP |
| 2,792,998 A * | 5/1957 | Dowty .................... | B64C 25/44 188/18 R |
| 4,892,270 A * | 1/1990 | Derrien .................... | B64C 25/34 244/104 R |
| 5,429,323 A * | 7/1995 | Derrien .................... | B64C 25/14 244/102 R |
| 11,014,654 B2 | 5/2021 | Thompson | |
| 2011/0180662 A1* | 7/2011 | Nardone ................. | B64C 25/14 244/102 R |
| 2014/0151499 A1* | 6/2014 | Mellor .................... | B64C 25/04 244/100 R |
| 2019/0002089 A1* | 1/2019 | Thompson .............. | B64C 25/10 |

FOREIGN PATENT DOCUMENTS

| | | |
|---|---|---|
| DE | 1051128 B | 2/1959 |
| EP | 0635426 A1 | 1/1995 |
| EP | 0705758 A1 | 4/1996 |
| GB | 809949 A | 3/1959 |
| GB | 2101542 A | 1/1983 |
| GB | 2563946 A | 1/2019 |
| WO | 2006094145 A1 | 9/2006 |

OTHER PUBLICATIONS

Extended European Search Report from corresponding European application No. 24216643 dated Mar. 18, 2025.

* cited by examiner

*Primary Examiner* — Tye William Abell
(74) *Attorney, Agent, or Firm* — Greer, Burns & Crain, Ltd.

(57) ABSTRACT

An aircraft landing gear has a suspension mechanism which has a four-bar linkage that comprises four links rigidly extending between a corresponding four pivots. A lower link of the four-bar linkage supports front and rear wheels, and is movable relative to an upper link between lengthened and shortened positions. A shock absorber urges the four-bar linkage towards the lengthened position. A length of the upper link of the four-bar linkage is adjustable.

20 Claims, 5 Drawing Sheets

AIRCRAFT LANDING GEAR

CROSS-REFERENCES TO RELATED APPLICATIONS

This application claims the benefit of Great Britain Application Number 2318286.8 filed on Nov. 30, 2023, the entire disclosure of which is incorporated herein by way of reference.

FIELD OF THE INVENTION

The present disclosure relates to the field of aircraft landing gear. It relates particularly, but not exclusively, to an aircraft landing gear, a suspension mechanism and an aircraft comprising such a landing gear.

BACKGROUND OF THE INVENTION

In many aircraft the main landing gear is attached to the fuselage of the aircraft and stowable into a cavity in a wing. In such aircraft, the need to stow into a wing means that each main landing gear must be positioned near to its respective wing and must be narrow enough (when stowed) to fit within the space available inside the wing. However, all else being equal wings with a high aspect ratio (i.e. wings which have a longer span but shorter chord) allow aircraft to fly more efficiently and thus use less fuel. Wings of higher aspect ratio have less space available for accommodating landing gear. Also, increasing the wingspan of an aircraft moves its center of gravity rearwards, since increasing the length of (rearward swept) wings moves more weight towards the rear.

Accordingly, there comes a point at which the wings and landing gear place opposing constraints on the design of the aircraft—the need for the landing gear to fit within the wings when stowed, and the need for the center of gravity of the aircraft to remain forward of the main landing gear, can prevent the aspect ratio of the wings being as high as would be desirable. Equally, the need for it to fit into a narrow wing can mean that it is necessary to use a landing gear which is less desirable (for instance in terms of weight, complexity, cost, ride comfort or braking performance).

As an illustration, one attempt to reach the best compromise of these conflicting constraints is to use a main landing gear where the main leg, in the form of an Oleo strut, is swept backwards slightly. This swept arrangement positions the wheels of the landing gear further backwards, which in turn means that the center of gravity of the aircraft can be further back. Also, the swept landing gear can match the swept shape of the wing to some extent, allowing it to fit into a narrower space. However, if the oleo strut is swept backwards at too great an angle then its shock absorbing properties are affected—with the Oleo strut being less well aligned with the direction of the weight of the aircraft, it acts as a stiffer spring so provides a worse ride quality, and it can be prone to sticking and then noticeably slipping when the weight of the aircraft changes (for instance as passengers embark). Thus there is an effective maximum angle of the Oleo strut, which places a limit on the aspect ratio of the wings.

The present invention seeks to mitigate one or more of the above-mentioned problems. Alternatively or additionally, the present invention seeks to provide an improved or alternative landing gear, suspension mechanism or aircraft.

SUMMARY OF THE INVENTION

According to a first aspect of the present invention there is provided an aircraft landing gear comprising a suspension mechanism which has a four-bar linkage and a shock absorber, wherein with the landing gear in a deployed configuration:
the four-bar linkage comprises an upper link rigidly extending from an upper front pivot to an upper rear pivot, a lower link rigidly extending from a lower front pivot to a lower rear pivot, a front link rigidly extending from the upper front pivot to the lower front pivot, and a rear link rigidly extending from the upper rear pivot to the lower rear pivot;
the lower link has a front wheel support and a rear wheel support, each wheel support being arranged to support one or more wheels;
the four-bar linkage is movable between a lengthened position and a shortened position, the upper and lower links being closer together when the four-bar linkage is in the shortened position than when it is in the lengthened position;
the shock absorber is arranged to urge the four-bar linkage away from the shortened position and towards the lengthened position; and
a length of the upper link is adjustable so as to change the distance between the upper front pivot and the upper rear pivot.

The length of the upper link being adjustable can allow the position of the four-bar linkage to be tailored to different circumstances, for instance allowing the landing gear to take a form more suited to stowage for cruising and a form more suited to providing shock absorption, ride comfort or the like when taxiing, taking off and landing. It may be particularly beneficial for the upper link to be adjustable because this link may bear smaller loads than other links such as the front link and rear link, which may place less strain on the mechanism by which it can be adjusted. Instead or as well, it may be beneficial for control lines (for instance electrical wiring and/or hydraulic ducting) to be run to the upper link for the purposes of adjusting it, rather than running to another link where they may need to be longer and/or may be more vulnerable to airborne debris and/or knocks.

The use of a four-bar linkage can allow the suspension mechanism to move, under load, in a manner which is beneficial to the performance of the aircraft while on the ground. For example, the four-bar linkage can hold the lower link generally horizontal (e.g. generally parallel to the ground) throughout the range of motion of the suspension mechanism, thereby keeping the wheel(s) supported by the front support and the wheel(s) supported by the rear support in good contact with the ground while the aircraft takes off or lands.

The term "suspension mechanism" is intended to have its conventional meaning. Where further definition is considered necessary, despite the understanding of the skilled person, a suspension mechanism may be considered to be a mechanism configured to bear the weight of the aircraft while on the ground, while allowing limited relative movement of the wheels relative to the aircraft so as to absorb shocks. A suspension mechanism may be damped, for instance using one or more hydraulic or electromagnetic dampers, or may be undamped.

Reference herein to a link rigidly extending between two pivots should be understood to mean that the link extends between those two pivots and at least the portion of the link which extends between the pivots is rigid. The term "rigid" is intended to have its conventional meaning. Where further definition is considered necessary, despite the understanding of the skilled person, a link may be considered to be rigid if it does not significantly deform during use (e.g. during movement of the four-bar linkage between the lengthened and shortened positions while taking off and landing).

For the avoidance of doubt, reference to "front", "rear" "upper" and "lower" links is used to denote general position of the links as a whole, more particularly of the parts of those links which extend between the relevant pivots. It is not intended to imply that different links cannot overlap with one another in different directions, or that any particular link reaches further in a particular direction than any other. For example, an upper link may have a part which extends further forward than the front link, and/or a part of the lower link may extend above the upper link. Where further definition is needed, despite the understanding of the skilled person, in a four-bar linkage the front link may be considered to be the link which has a mid-point, between its respective pivots, which is furthest forward out of the four links. Equally the upper link may be considered to be the link which has a mid-point between its pivots which is furthest vertically upwards, and so on.

Each wheel support may be, for example, an axle, an aperture for an axle, or a mounting feature for engagement with a complementary mounting feature of an axle.

The shock absorber may be, for example, a sprung hydraulic damper, a gas spring, a coil spring assembly or an Oleo strut.

The length of the upper link may be adjustable using, for example, a lead screw mechanism, a ball screw mechanism or a hydraulic cylinder.

Each of said links may be generally elongate in shape. As an alternative, a part or all of a non-elongate body may form one or more of the links.

The pivots may be arranged parallel to one another, thereby constraining the movement of the four-bar linkage. For example, the pivots may constrain the four-bar linkage to move within a plane.

It is to be understood that reference herein to a "shortened position" and a "lengthened position" should not be construed as limiting. Any suitable pair of positions may be a shortened position and a lengthened position, provided that the upper and lower links are closer together when in the "shortened position" than when in the "lengthened position".

Movement of the four-bar linkage from the lengthened position to the shortened position may pivot the front and rear links rearward relative to the upper link.

Accordingly, the lower link (and thus the wheels) may be positioned more rearward when the landing gear is under load (e.g. when an aircraft comprising the landing gear is resting on its wheels). This can allow the center of gravity of the aircraft to be further back, which in turn may allow wings of higher aspect ratio to be used (for example).

The landing gear may be configured whereby an increase in the length of the upper link causes the rear wheel support to lower relative to the front wheel support.

In an aircraft comprising the landing gear, the center of gravity of the aircraft may lie forward of the wheel(s) supported by the rear wheel support but behind the wheel(s) supported by the rear wheel support. In such aircraft it may be particularly beneficial for increasing the length of the upper link to lower the rear wheel support relative to the front wheel support as this may ensure that the rear wheel touches down first when landing, thereby avoiding any tendency for the aircraft to tip backwards during touchdown.

As an alternative, the landing gear may be configured whereby an increase in the length of the upper link causes the front wheel support to lower relative to the rear wheel support. As another alternative, the landing gear may be configured whereby an increase in the length of the upper link does not cause any change in height of the wheel supports relative to one another.

The landing gear may further comprise a main leg which extends from a proximal mounting point configured for attachment to an aircraft to a distal mounting point attached to the four-bar linkage.

The main leg may give the landing gear greater vertical height, which may in turn give an aircraft comprising the landing gear greater ground clearance. Greater ground clearance may allow the aircraft to take off and/or land at steeper angles than would be possible with shorter landing gear.

As an alternative, the four-bar linkage may be configured to be attached directly to a body of an aircraft (for instance a fuselage or a wing), or the landing gear may comprise another structure configured to attach the four-bar linkage to the body.

The main leg may be rigid. Alternatively, it may be resiliently deformable (for instance in the manner of an Oleo strut).

The distal mounting point of the main leg may be attached at or adjacent to a pivot of the four bar linkage.

For example, the distal mounting point of the main leg may be attached at or adjacent to the upper rear pivot.

As an alternative, the distal mounting point of the main leg may be attached to any other suitable point on the four-bar linkage, for instance at a location on one of the links (such as the upper link) which is substantially central between the two pivots of that link.

The distal mounting point of the main leg may be pivotably attached to the four-bar linkage.

This can afford the four-bar linkage advantageous freedom of movement relative to the main leg.

As an alternative, the distal mounting point of the main leg may be rigidly attached to one of the links of the four bar linkage (for instance the upper link).

Where the distal mounting point of the main leg is attached at or adjacent to a pivot of the four bar linkage and is pivotably attached to the four bar linkage, one of the pivots of the four-bar linkage (for example the upper rear pivot) may also pivotably connect the main leg to the four bar linkage.

One of the upper front pivot and the upper rear pivot may pivotably attach the main leg to the upper link of the four-bar linkage, and the landing gear may further comprise an auxiliary link which extends between the main leg and the other of the upper front pivot and the upper rear pivot.

The auxiliary link may provide movable structural support to the upper link, for instance compliantly holding the upper link in a required orientation relative to the main leg as the length of the upper link is adjusted.

The shock absorber may extend between a proximal mounting point attached to the main leg and a distal mounting point attached to the four-bar linkage.

With both the four-bar linkage and the shock absorber being supported by the main leg, the suspension mechanism may be able to operate without the main leg moving. This may reduce the shock loading exerted on the main leg which, in turn, may allow the proximal mounting point of the main leg to be advantageously compact, simple and/or lightweight. Instead or as well, it may allow the landing gear to fold for stowage using an advantageously compact, simple and/or lightweight mechanism.

The proximal mounting point of the shock absorber may be pivotably attached to the main leg.

The distal mounting point of the shock absorber may be attached at or adjacent to a pivot of the four-bar linkage.

For example, the distal mounting point of the shock absorber may be attached at or adjacent to the lower rear pivot.

As an alternative, the distal mounting point of the shock absorber may be attached to any other suitable point on the four-bar linkage, for instance at a location on one of the links (such as the lower link) which is substantially central between the two pivots of that link.

The distal mounting point of the shock absorber may be pivotably attached to the four-bar linkage.

This can afford the four-bar linkage advantageous freedom of movement relative to the shock absorber.

As an alternative, the distal mounting point of the main leg may be slidably attached or rigidly attached to one of the links of the four bar linkage (for instance the lower link).

Where the distal mounting point of the shock absorber is attached at or adjacent to a pivot of the four bar linkage and is pivotably attached to the four bar linkage, one of the pivots of the four-bar linkage (for example the lower rear pivot) may also pivotably connect the shock absorber to the four bar linkage.

The main leg may define an elongate recess or cavity which extends along a longitudinal axis of the main leg and accommodates wiring and/or hydraulic ducting therein.

The wiring and/or ducting passing through the elongate recess or cavity may advantageously protect it from knocks or impact from airborne debris. Instead or as well, it may reduce the overall diameter of the main leg in contrast to arrangements where wires and/or ducting pass along the outside of the main leg.

The recess or cavity may be open-faced, for instance taking the form of a groove. Alternatively, the cavity may be circumferentially enclosed by the main leg.

With the landing gear in the deployed configuration the main leg and shock absorber may be positioned in a main leg plane.

The main leg and the shock absorber being positioned in a plane may make the landing gear more aerodynamic when in the deployed position (for instance if the plane is aligned parallel to the direction of air flow. Instead or as well, it may make the landing gear more compact in a particular direction, which may make it easier to stow.

The main leg plane may be considered to be a plane containing longitudinal axes of the main leg and the shock absorber.

With the landing gear in the deployed configuration, the upper link, lower link, front link and rear link may co-operatively define a linkage plane.

All the links of the four-bar linkage being positioned in a plane may make the landing gear more aerodynamic when in the deployed position (for instance if the plane is aligned parallel to the direction of air flow). Instead or as well, it may make the landing gear more compact in a particular direction, which may make it easier to stow.

Alternatively or in addition, all the links being positioned in a plane may allow the motion of the four-bar linkage to more easily remain in that plane, which may allow the movement of the wheels supported by the wheel supports of the lower link to be advantageously stable.

With the landing gear in the deployed configuration, the main leg may be positioned substantially in the linkage plane.

With the main leg and four-bar linkage having a common plane, the landing gear may be still more aerodynamic when deployed and/or may be more compact in a particular orientation and thus even easier to stow.

As an alternative, the main leg may run parallel to the linkage plane. As another alternative, the main leg may extend at an angle to the linkage plane.

With the landing gear in the deployed configuration the shock absorber may be positioned substantially in the linkage plane.

With the shock absorber and four-bar linkage having a common plane, the landing gear may be still more aerodynamic when deployed and/or may be more compact in a particular orientation and thus even easier to stow.

As an alternative, the shock absorber may run parallel to the linkage plane. As another alternative, the shock absorber may extend at an angle to the linkage plane.

The front wheel support may be positioned at or adjacent to the lower front pivot.

This may allow the kinematics of the suspension mechanism to be relatively simple and/or predictable, with the front wheel support moving in substantially the same manner as the lower front pivot. This may make the performance of the suspension mechanism more predictable and/or controllable.

Instead or as well, the front wheel support being in this position may reduce the effect that pivoting of the lower link about the lower front pivot has on the wheel(s) attached thereto. In some arrangements little movement of said wheel(s) may be beneficial to the performance of the suspension mechanism, as discussed later.

The rear wheel support may be positioned rearward of the lower rear pivot.

With the rear wheel support so positioned, a relatively small upward rotation of the lower link (for instance due to adjustment of the length of the upper link) can result in relatively large downward movement of the rear wheel support. This may be beneficial where it is desired for the wheel(s) supported by the rear wheel support to leave the ground last on takeoff and/or touch the ground first during landing, which may be the case for example if the center of gravity of the aircraft lies on or behind the wheel(s) supported by the front wheel support.

Instead or as well, the rear wheel support being positioned rearward of the lower rear pivot may allow the landing gear reach further back from any given mounting point on an aircraft. This, in turn, may allow the center of gravity of the aircraft to be positioned further back (for instance due to high aspect ratio wings).

As an alternative, the rear wheel support may be positioned at the lower rear pivot. As another alternative, the rear wheel support may be positioned in front of the lower rear pivot.

The lower rear pivot may be positioned substantially centrally between the front and rear wheel supports.

This can make the motion of the front and wheel supports, and thus of the wheels attached thereto, advantageously stable during pivoting of the lower link about the lower rear pivot. In contrast, in an arrangement where one wheel support was considerably further from the lower rear pivot, due to the effect of leverage being different depending on the wheel support in question a disturbance to one wheel would have a different effect than the same disturbance to the other wheel.

The landing gear may be movable between the deployed configuration and a stowed configuration.

By stowing the landing gear when not needed (e.g. when cruising), an aircraft comprising the landing gear may be more aerodynamic.

The landing gear may be configured to rotate between the deployed and stowed configurations. As an alternative, the landing gear may be configured to move between the stowed and deployed configurations purely by translation (for instance vertical extension/retraction).

Instead or as well, the landing gear may be configured to fold when moving from the deployed configuration to the stowed configuration, and unfold when moving from the stowed configuration to the deployed configuration. This may allow the landing gear to take a more compact form when stowed, thereby saving space.

According to a second aspect of the present invention there is provided an aircraft landing gear comprising a suspension mechanism which comprises a biasing member and a linkage, the linkage comprising four rigid elongate members connected to one another by pivots to form a quadrilateral with one of said pivots in each corner, wherein:

one of said rigid elongate members forms a bottom of the quadrilateral and has a forward wheel mounting point and a rearward wheel mounting point;

one of said rigid members forms a top of the quadrilateral;

the suspension mechanism has a tall configuration and a short configuration, the rigid members forming the top and bottom of the quadrilateral being closer together when the suspension mechanism is in the short configuration than when the suspension mechanism is in the tall configuration;

the biasing member biases the suspension mechanism towards the tall configuration; and the rigid elongate member forming the top of the quadrilateral is adjustable in length so as to change the distance between two of said pivots.

The rigid elongate member forming the top of the quadrilateral being adjustable in length can allow the shape of the quadrilateral, and thus the configuration of the suspension mechanism, to be tailored to different circumstances. For instance, it may allow the landing gear to take a form more suited to stowage for cruising and a form more suited to providing shock absorption, ride comfort or the like when taxiing, taking off and landing.

The use of a quadrilateral with pivots at each corner can allow the suspension mechanism move, under load, in a manner which is beneficial to the performance of the aircraft while on the ground. For example, the quadrilateral can hold the link forming the bottom of the quadrilateral generally horizontal (e.g. generally parallel to the ground) throughout the range of motion of the suspension mechanism, thereby keeping the wheel(s) supported by the forward wheel mounting point and rearward wheel mounting point in good contact with the ground while the aircraft takes off or lands.

According to a third aspect of the present invention there is provided a suspension mechanism for an aircraft landing gear according to the first or second aspect of the invention.

Such a suspension mechanism may be used to provide a landing gear with one or more of the advantages discussed above.

According to a fourth aspect of the present invention there is provided an aircraft comprising an aircraft landing gear according to the first or second aspect of the invention.

The aircraft may comprise a landing gear according to the first or second aspect of the invention as a main landing gear. Instead or as well, the aircraft may comprise a landing gear according to the first or second aspect of the invention as a nose landing gear.

The aircraft may be a fixed wing aircraft such as a commercial passenger airliner. As an alternative, the aircraft may be a rotary wing aircraft.

The landing gear according to the first or second aspects of the invention may be mounted for example to a fuselage of an aircraft and/or to a wing of the aircraft.

With the landing gear in the stowed configuration, at least part of the landing gear may be received within a cavity in a wing of the aircraft.

This can further improve the aerodynamics of the aircraft.

Instead or as well, with the landing gear in the stowed configuration at least part of the landing gear may be received within a cavity in a fuselage of the aircraft.

Instead or as well, with the landing gear in the stowed configuration at least part of the landing gear may be received within a discrete housing, for instance a housing mounted on a wing and/or a fuselage of the aircraft.

The shock absorber may define a longitudinal axis, and when in the deployed configuration the landing gear may be arranged to prevent the longitudinal axis of the shock absorber from reaching an angle of less than 70 degrees, for instance less than 75 degrees or less than 80 degrees, relative to a plane containing the pitch and roll axes of the aircraft.

With the shock absorber held approximately vertically in this way (when the aircraft is level), it can be aligned beneficially closely with the direction through which the aircraft's weight acts. This, in turn, can improve the response of the shock absorber (and thus of the suspension mechanism as a whole).

The landing gear may be arranged to hold the lower link generally parallel to a plane containing the pitch and roll axes of the aircraft throughout movement of the four-bar linkage between the lengthened and shortened positions.

With the lower link held approximately horizontal in this way (when the aircraft is level), the front and rear wheel supports may be held at approximately the same height from the ground. Accordingly, wheels supported thereby may be positioned approximately the same height when coming into land, so that they touch down at around the same time during landing, and/or a relatively equal proportion of the weight of the aircraft may be borne by each wheel (rather than if one of the wheel supports were noticeably lower, whereupon the wheels supported thereby may take an excessive proportion of the weight).

It will of course be appreciated that features described in relation to one aspect of the present invention may be incorporated into other aspects of the present invention.

BRIEF DESCRIPTION OF THE DRAWINGS

Embodiments of the present invention will now be described by way of example only with reference to the accompanying schematic drawings of which.

DETAILED DESCRIPTION OF THE PREFERRED EMBODIMENTS

Figure 1:
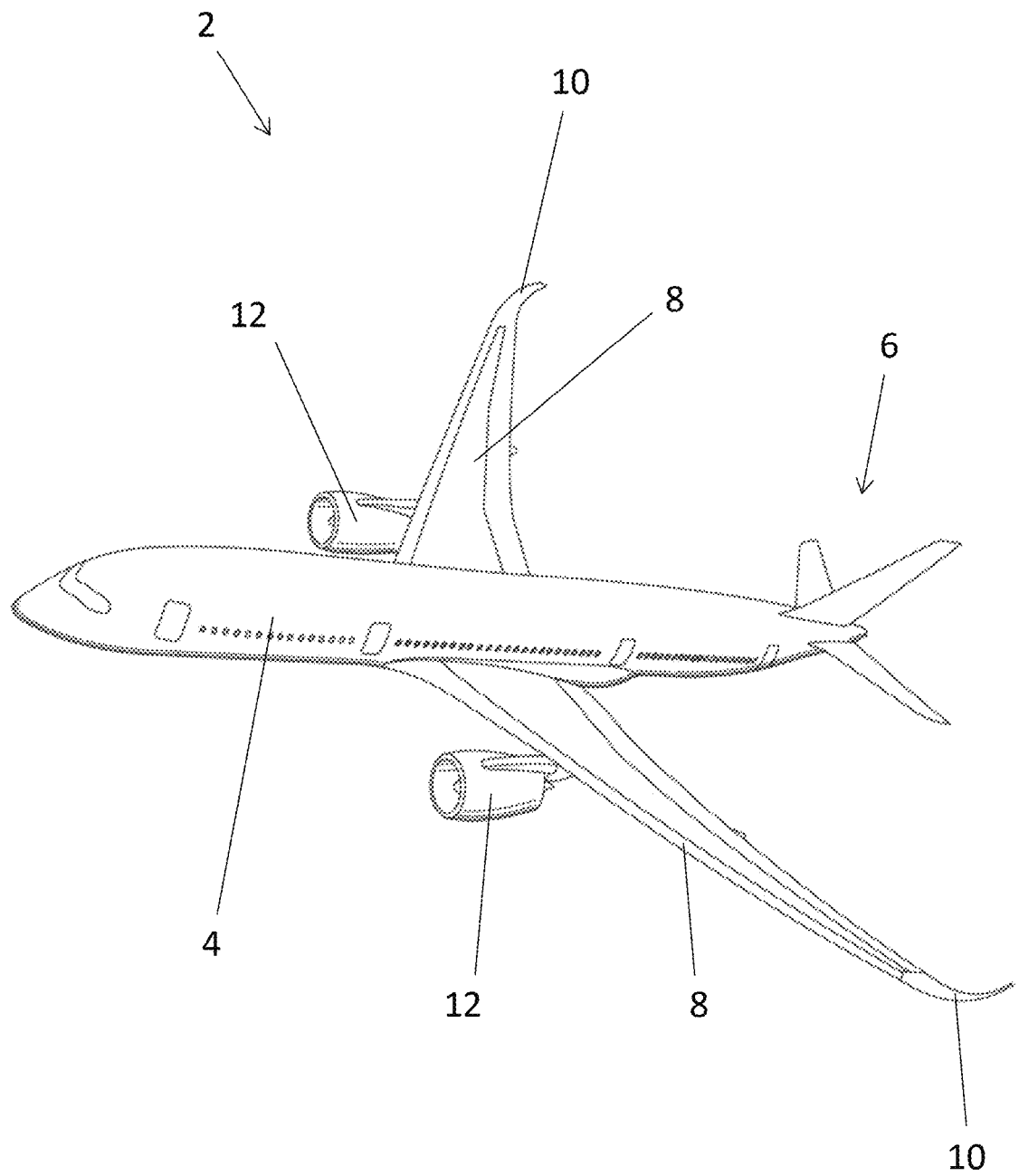
FIG. 1 shows a perspective view of an aircraft according to a first embodiment of the invention.

FIG. 1 shows an aircraft 2 according to an embodiment of the invention. It has a fuselage 4, a tail 6 and two wings 8.

Each wing 8 extends from the fuselage 4 in a spanwise direction and terminates in an upturned wing tip 10. Each wing 8 supports an engine 12 part way along its spanwise length. These components of the aircraft are of conventional design and have minimal relevance to the present invention, therefore will not be described in detail.

The aircraft 2 has three landing gear, which are not visible in FIG. 1 due to their each being in a stowed configuration. In the present embodiment the aircraft 2 has a nose landing gear positioned on the underside of the fuselage 4 at the front of the aircraft, and two main landing gear positioned on the undersides of respective wings 8, between the engine 12 and the fuselage 4 of that wing 8. The nose landing gear is of conventional design and is not material to the present invention, therefore will not be described in detail.

Figure 2:
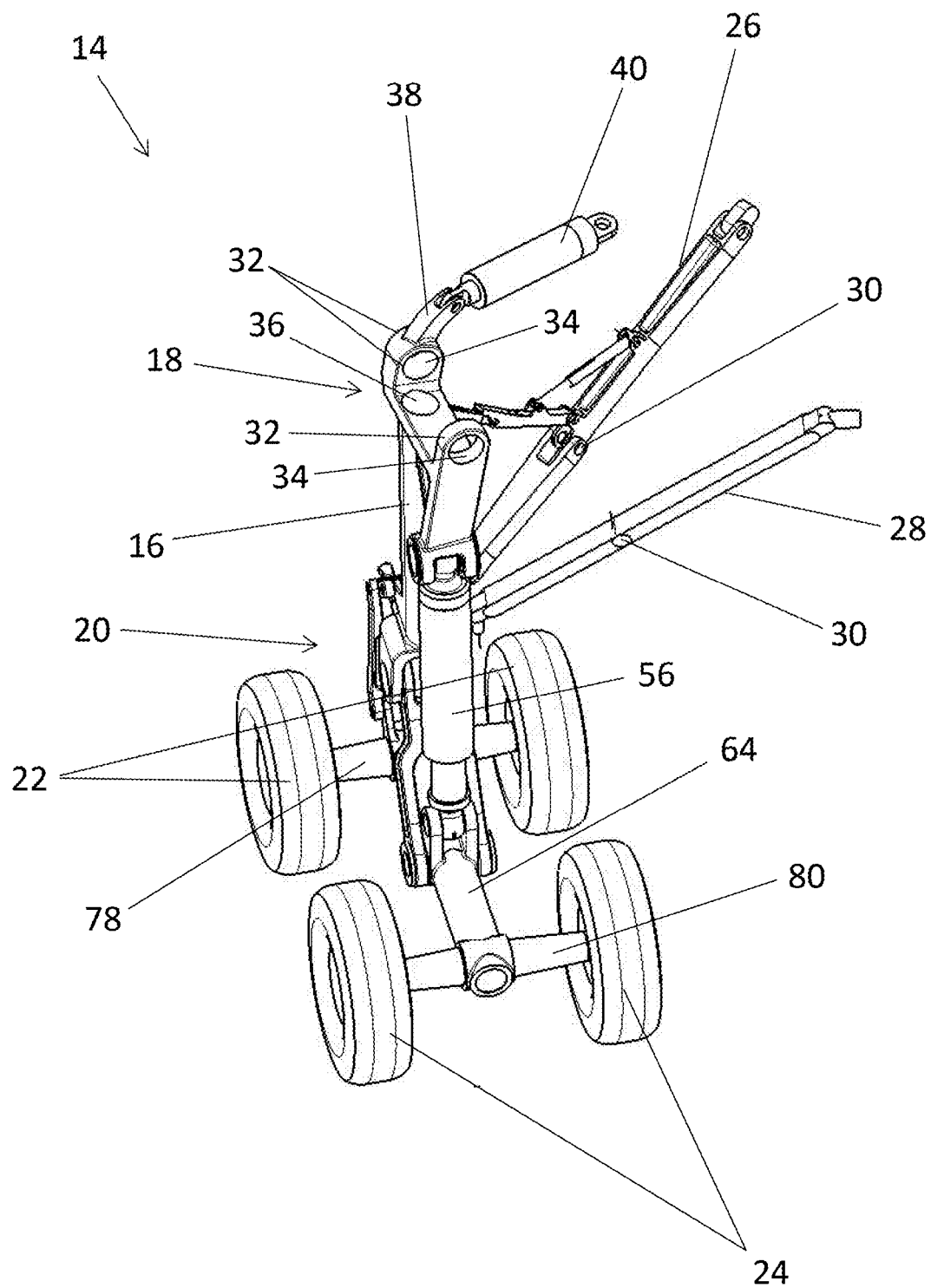
FIG. 2 shows a rear perspective view of a landing gear of the aircraft of FIG. 1.

FIG. 2 shows one of the main landing gear 14 of the aircraft 2 in a deployed configuration. More specifically, FIG. 2 shows the left main landing gear 14. The right main landing gear is substantially a mirror image of the left main landing gear 14. Referring now to FIG. 2 in combination with FIG. 1, the landing gear 14 has a main leg 16 extending generally downward (when the landing gear 14 is in the deployed configuration) from a proximal mounting point 18. The main leg 16 supports a suspension mechanism 20 which, in turn, supports two front wheels 22 and two rear wheels 24.

The landing gear 14 also has a front inboard sidestay 26 and a rear inboard sidestay 28 which run between pivotable joints on the main leg 16 and the internal structure (not shown) of the wing 8. The sidestays 26, 28 provide structural support to the main leg 16, in particular stabilizing the main leg 16 against lateral loads and drag loads. Each sidestay 26, 28 has a hinge joint 30 around its center to aid with stowage as described below.

The proximal mounting point 18 of the main leg 16 has a set of three tabs 32 each of which has a circular aperture 34. The apertures 34 are aligned with one another and positioned to receive a shaft (not visible) provided in the internal structure of the wing 8 so as to attach the landing gear 14 to the aircraft 2. Near the proximal mounting point 18, the main leg 16 has an elongate cavity 36 the purpose of which will be discussed later.

Figure 3:
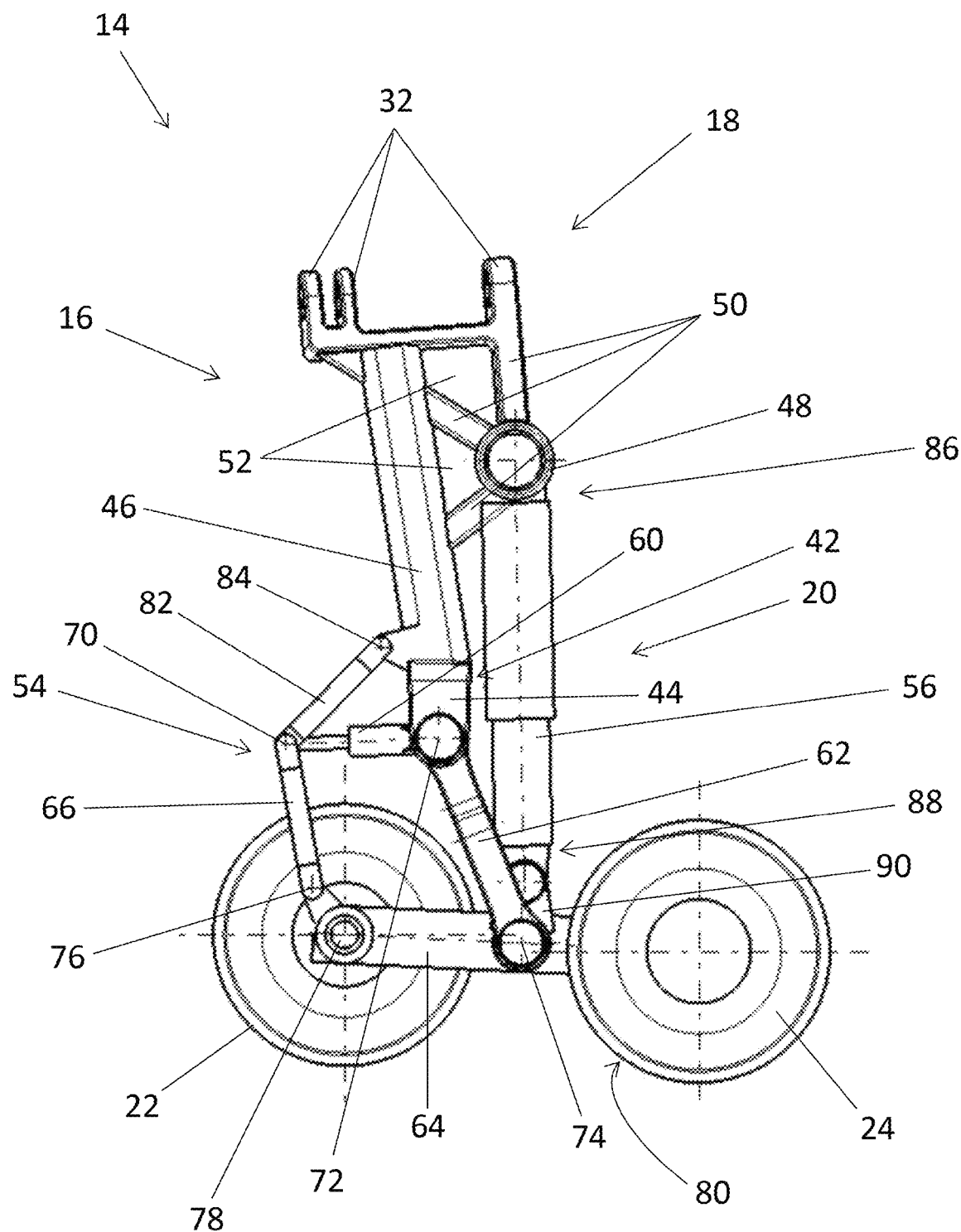
FIG. 3 shows a side view of the landing gear of FIG. 2, with a four-bar linkage thereof in a lengthened position.

The proximal mounting point 18 also has a projection 38 extending from between two of the tabs 32 and pivotably connected to a stowage actuator 40 in the form of a hydraulic cylinder. The stowage actuator 40 is arranged to move the landing gear 14 between the stowed and deployed configurations. To move the landing gear 14 from the deployed configuration (as shown in FIGS. 2 and 3) to the stowed configuration, the stowage actuator 40 is extended so as to push on the projection 38 of the main leg 16, urging it to rotate (anticlockwise from the perspective of FIG. 2). The sidestays 26, 28 of the landing gear 14 fold at their respective hinge joints 30 so as to allow the main leg 16 to rotate inboard. Continued extension of the stowage actuator 40 rotates the landing gear into a cavity (not visible) in the underside of the wing 8. To move the landing gear 14 from the stowed configuration to the deployed configuration the stowage actuator 40 is retracted and the above process is reversed.

FIG. 3 shows the landing gear 14 from the side (more particularly the left side), from which more detail of the main leg 16 and suspension mechanism 20 can be ascertained. It is noteworthy that in this view one of the front wheels 22 has been removed, as have the folding sidestays 26, 28, the projection 38 and the stowage actuator 40. Referring now to FIGS. 2 and 3 in combination with FIG. 1, the main leg 16 extends from the proximal mounting point 18 to a distal mounting point 42 which is provided by a pair of tabs 44 (one of which is visible in FIG. 3). The main leg 16 has a tube member 46 extending between the proximal and distal mounting points 18, 42, and a boss 48 supported by three struts 50 that have a pair of webs 52 therebetween.

The suspension mechanism 20 has a four-bar linkage 54, and a shock absorber 56 which in this embodiment takes the form of an Oleo strut. The four-bar linkage is made up from an upper link 60, a rear link 62, a lower link 64 and a front link 66 connected together by an upper front pivot 70, an upper rear pivot 72, a lower rear pivot 74 and a lower front pivot 76. The upper link 60 extends between the upper front pivot 70 and the upper rear pivot 72, the rear link 62 extends between the upper rear pivot 72 and the lower rear pivot 74, the lower link 64 extends between the lower rear pivot 74 and the lower front pivot 76, and the front link 66 extends between the lower front pivot 76 and the upper front pivot 70. In other words, the upper front pivot 70 pivotally connects the front link 66 and the upper link 60, the upper rear pivot pivotally connects the upper link 60 and the rear link 62, the lower rear pivot 74 pivotally connects the rear link 62 and the lower link 64, and the lower front pivot pivotally connects the lower link 64 and the front link 66. Each of the links 60, 62, 64, 66 is substantially rigid and therefore rigidly extends between its respective pivots 70, 72, 74, 76.

The front and rear links 66, 62 are each made up of a pair of parallel arms, one of which is visible from the perspective of FIG. 3. The lower link 64 takes the form of a generally cylindrical beam, and includes a front wheel support 78 and a rear wheel support 80 each of which takes the form of a fixed axle. The front wheel support 78 rotatably supports the front wheels 22 and the rear wheel support 80 rotatably supports the rear wheels 24. The upper link 60 of this embodiment takes the form of a hydraulic cylinder with locking functionality. The locking functionality enables the cylinder, i.e, link 60, to be rigid, preventing axial force exerted thereon from causing the cylinder to retract (in the case of axial compression) or extend (in the case of axial tension).

The distal mounting point 42 of the main leg 16 is attached, more particularly pivotally attached, to the four-bar linkage 54 at the upper rear pivot 72. The upper rear pivot 72 thus pivotally connects the main leg 16 to the upper link 60 and to the rear link 62, as well as pivotally connecting the upper link 60 to the rear link 62. The main leg 16 is also connected to the four-bar linkage 54 by an auxiliary link 82 which extends between the upper front pivot 70 and a pivot joint 84 on the tube member 46 of the main leg 16. The auxiliary link 82 is pivotally connected to the upper link 60 by the upper front pivot 70. The upper front pivot 70 therefore pivotally connects the auxiliary link 82 to the upper link 60 (and indeed pivotally connects the auxiliary link 82 to the front link 66), as well as pivotally connecting the upper link 60 to the front link 66.

As noted above, the main leg 16 has an elongate cavity 36. This is a fully enclosed cavity which extends through the tube member 46 along the longitudinal axis of the main leg 16 and terminates at an exit (not visible) near the distal mounting point 42. Hydraulic ducting (not visible) to supply the hydraulic cylinder forming the upper link 60 runs along the elongate cavity 36, as does wiring which leads to electronic wheel speed sensors (not visible).

The shock absorber 56 of the suspension mechanism 20 extends from a proximal mounting point 86 which is pivotably attached to the boss 48 of the main leg 16, to a distal mounting point 88 which is pivotably connected to a projection 90 of the lower link 64 at a position adjacent to the lower rear link 74. In this embodiment the main leg 16 and the shock absorber 56 are positioned in the same plane, which is referred to herein as a main arm plane.

The links 60, 62, 64, 66 of the four-bar linkage 54 are all positioned in the same plane, which herein is referred to as a linkage plane. In the present embodiment the main arm plane and the linkage plane are co-planar, forming a single plane. In other embodiments, however, the main arm plane and the linkage plane (where present) may be parallel to one another or positioned at an angle to one another. As is shown in FIG. 2, the main leg 16, four-bar linkage 54 and shock absorber 56 being positioned in the same plane gives the landing gear 14 a particularly slim profile when viewed from the front/back. This not only makes it relatively aerodynamic, but also allows it to be stowed into a relatively shallow cavity in the wing 8.

FIGS. 2 and 3 show the landing gear with the four-bar linkage 54 in a lengthened position. The four-bar linkage 54 is movable between the lengthened position and a shortened position. The landing gear 14 is shown with the four-bar linkage 54 in the shortened position in FIG. 4, which will now be referred to in combination with FIGS. 1 to 3.

With the four-bar linkage 54 in the shortened position, the upper and lower links 60, 64 are closer together than when the four-bar linkage 54 is in the lengthened position. As the four-bar linkage 54 moves from the lengthened position to the shortened position the front link 66 pivots backwards relative to the upper link 60 about the upper front pivot 70, the rear link 62 pivots backwards relative to the upper link 60 about the upper rear pivot 72, and the lower link 64 swings rearwards and upwards relative to the upper link 60 along with the lower front pivot 76 and the lower rear pivot 74. It is to be understood, however, that this description applies when one takes the main leg 16 and upper link 60 as the frame of reference. It may equally be said that as the four-bar linkage 54 moves from the lengthened position to the shortened position the front link 66 pivots forwards relative to the lower link 64 about the lower front pivot 76, the rear link 62 pivots forward relative to the lower link 64 about the lower rear pivot 74, and the upper link swings downwards and forwards relative to the lower link 64 along with the upper front pivot 70 and upper rear pivot 72.

The shock absorber 56 urges the four-bar linkage 54 away from the shortened position and to the lengthened position. With the four-bar linkage 54 in the shortened position (or indeed in any position between the lengthened position and the shortened position) the shock absorber 56 is compressed between the boss 48 and the lower rear pivot 74. The restorative force from the shock absorber 56 biases the boss 48 and lower rear pivot 74 apart, thereby biasing the four-bar linkage to the lengthened position. However, when the aircraft 2 is on the ground a portion of its weight acts through the landing gear 14, forcing the four-bar linkage to the shortened position against the bias of the shock absorber 56. In the event of shock loading, for instance when first touching down or when hitting a bump while taxiing, the four-bar linkage 54 may be compressed further, to a position beyond the shortened position, but the restorative force from the shock absorber 56 then returns the landing gear to the shortened position.

It is noteworthy that throughout the movement of the four-bar linkage 54 between the lengthened and shortened positions, the upper link 60 and lower link 64 remain generally parallel with one another. With the upper link 60 being positioned generally parallel to a plane containing the pitch and roll axes (not shown) of the aircraft 2, this has the effect of keeping the lower link 64 generally parallel to that plane too. With the front and rear wheels 22, 24 having the same diameter, this means that with the aircraft flying level both wheels will touch the ground with approximately the same force. This can have benefits in terms of braking performance, for example.

The structure and function of the landing gear 14 has been described above in relation to the configuration that it is expected to occupy when engaging the ground, and in flight shortly before or after engaging the ground. However, the landing gear has a further configuration which is entered by changing the length of the upper link 60 of the four-bar linkage 54. More particularly, in this embodiment the length of the upper link 60 can be increased by extending the hydraulic cylinder as shown in FIG. 5.

Figure 4:
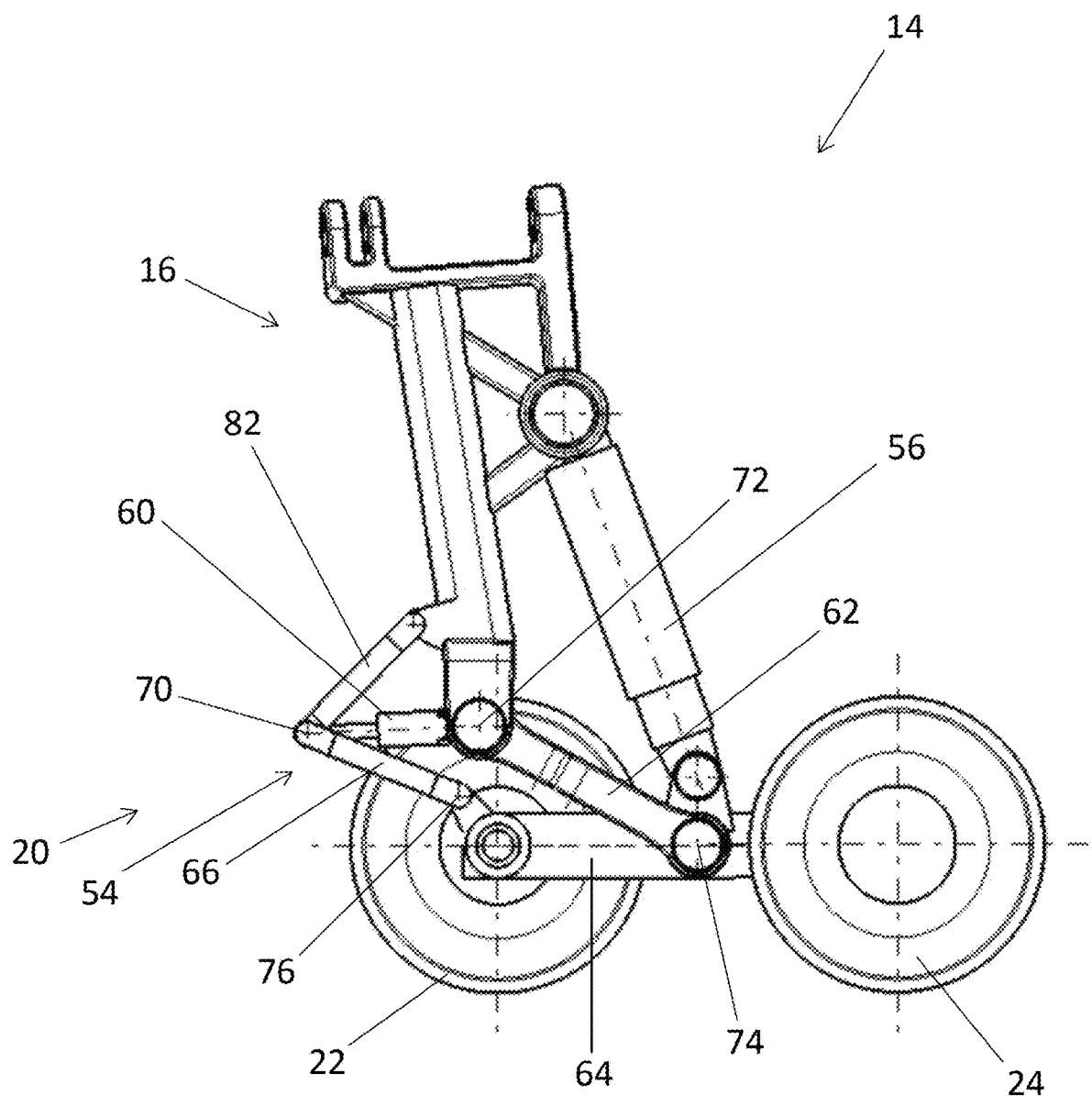
FIG. 4 shows a side view of the landing gear of FIGS. 2 and 3, with the four-bar linkage in a shortened position.
Figure 5:
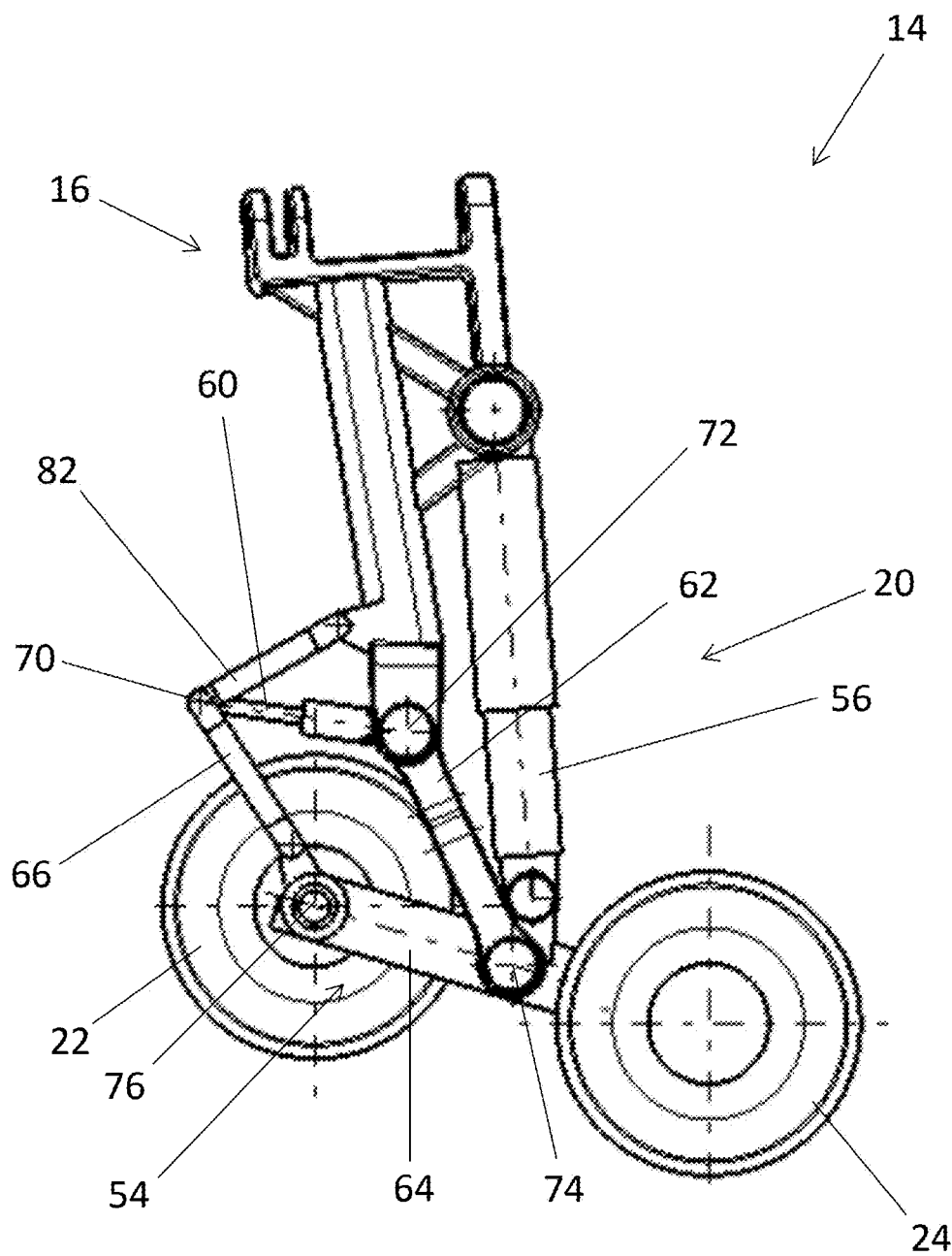
FIG. 5 shows a side view of the landing gear of FIGS. 2 to 4, with a length of an upper link of the four-bar linkage having been increased.

Referring now to FIG. 5 in combination with FIGS. 1 to 4, increasing the length of the upper link 60 changes the shape of the four-bar linkage 54. More particularly, in the present embodiment the auxiliary link 82 in effect tethers the upper front pivot 70 (and thus the front end of the upper link 60) to the pivot joint 84. Accordingly, as the upper link 60 increases in length it pivots upwards about the upper rear pivot 72. Since the lower link 64 is in effect tethered to the upper link 60 by the front link 66 (and by the rear link 62), the lower link 64 lift upwards as well. This has the effect of dropping the rear wheels 24 relative to the front wheels 22 (or, in other words, lifting the front wheels 22 relative to the rear wheels 24).

It is noteworthy that in the present embodiment, while the lower link 64 remains generally parallel to the upper link 60 regardless of its length, adjustment of the length of the upper link 60 from the length shown in FIGS. 2 to 4 to the length shown in FIG. 5 moves the upper and lower links 60, 64 such that they are no longer parallel to the plane which includes the pitch and roll axes (not shown) of the aircraft 2.

In the present embodiment, the purpose of increasing the length of the upper link 60 is to rotate the lower link 64 upwards and thus reduce the front-to-back length of the landing gear 14 as a whole (which in this case is determined by the horizontal distance between the front of the front wheels 22 and the rear of the rear wheels 24). This allows the landing gear 14 to stow into a narrower cavity in the wing 8 (which may be all the space which is available in a wing of high aspect ratio).

It is of particular note that in the present embodiment the front wheel support 78 is positioned adjacent to the lower front pivot 76. With the front wheel support 78 so positioned, vertical shocks imparted to the front wheels 22 by the ground exert only a small moment urging the lower link 64 to rotate about the lower front pivot 76. Thus, relatively little (if any) rotation of the lower link 64 about that pivot 76 takes place. Any such shock would impart a larger moment urging the lower link 64 to rotate about the lower rear pivot 74, however that moment can be more effectively counteracted by the rear wheels 24 being in contact with the ground, attenuating the effect that such a shock would have on the aircraft 2 as a whole.

It is also noteworthy that the rear wheel support 80 is positioned rearward of the lower rear pivot 74, and indeed the lower rear pivot 74 is positioned generally centrally between the front and rear wheel supports 78, 80. With the distance between lower rear pivot 74 and each of the wheel supports 78, 80 being substantially the same, the moment produced by the front wheels 22 is substantially the same as that produced by the rear wheels 24. The suspension mechanism 20 can therefore be more stable. In contrast, if the rear wheel support 80 were considerably further away from the lower rear pivot 74, for example, then due to its extra leverage an upward shock exerted on a rear wheel 24 could cause the front wheels 22 to be forced into the ground with increased force. This, in turn, could cause the landing gear 14 to bounce up, which could have a negative impact on ride comfort.

A final fact of note about the configuration of the present embodiment is that the landing gear is configured to hold the shock absorber 56 such that it is prevented from moving to a position in which its longitudinal axis is at an angle of less than around 82 degrees relative to a plane containing the pitch and roll axes (not shown) of the aircraft. In other words, the shock absorber 56 is held generally vertical when the aircraft 2 is level. Thus, the shock absorber 56 is aligned relatively closely with the direction through which the weight of the aircraft 2 acts.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The term 'or' shall be interpreted as 'and/or' unless the context requires otherwise.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft landing gear comprising:
 a suspension mechanism which has a four-bar linkage and a shock absorber, wherein with the aircraft landing gear in a deployed configuration:
 the four-bar linkage comprises an upper link rigidly extending from an upper front pivot to an upper rear pivot, a lower link rigidly extending from a lower front pivot to a lower rear pivot, a front link rigidly extending from the upper front pivot to the lower front pivot, and a rear link rigidly extending from the upper rear pivot to the lower rear pivot;
 the lower link has a front wheel support and a rear wheel support, each wheel support being arranged to support one or more wheels;
 the four-bar linkage is configured to move between a lengthened position and a shortened position, the upper link and the lower link being closer together when the four-bar linkage is in the shortened position than when the four-bar linkage is in the lengthened position;
 the shock absorber is arranged to urge the four-bar linkage away from the shortened position and towards the lengthened position; and
 a length of the upper link is configured to be adjusted so as to change a distance between the upper front pivot and the upper rear pivot.

2. The aircraft landing gear according to claim 1, wherein movement of the four-bar linkage from the lengthened position to the shortened position pivots the front link and the rear link rearward relative to the upper link.

3. The aircraft landing gear according to claim 1, wherein the landing gear is configured such that an increase in the length of the upper link causes the rear wheel support to lower relative to the front wheel support.

4. The aircraft landing gear according to claim 1, wherein the front wheel support is positioned at or adjacent to the lower front pivot.

5. The aircraft landing gear according to claim 1, wherein with the landing gear in the deployed configuration, the upper link, the lower link, the front link, and the rear link co-operatively define a linkage plane, and, optionally,
 wherein with the landing gear in the deployed configuration, a main leg of the aircraft landing gear is positioned substantially in the linkage plane.

6. The aircraft landing gear according to claim 5, wherein with the landing gear in the deployed configuration the shock absorber is positioned substantially in the linkage plane.

7. The aircraft landing gear according to claim 1, wherein the rear wheel support is positioned rearward of the lower rear pivot.

8. The aircraft landing gear according to claim 7, wherein the front wheel support is positioned at or adjacent to the lower front pivot, and
 wherein the lower rear pivot is positioned substantially centrally between the front and rear wheel supports.

9. The aircraft landing gear according to claim 1, further comprising:
 a main leg which extends from a proximal mounting point configured for attachment to an aircraft to a distal mounting point attached to the four-bar linkage.

10. The aircraft landing gear according to claim 9, wherein the distal mounting point of the main leg is attached at or adjacent to a pivot of the four-bar linkage.

11. The aircraft landing gear according to claim 9, wherein the main leg defines a recess or a cavity which extends along a longitudinal axis of the main leg and accommodates wiring, or hydraulic ducting, or both therein.

12. The aircraft or landing gear according to claim 9, wherein with the landing gear in the deployed configuration the main leg and the shock absorber are positioned in a main leg plane.

13. The aircraft landing gear according to claim 9, wherein the distal mounting point of the main leg is pivotably attached to the four-bar linkage.

14. The aircraft landing gear according to claim 13, wherein the distal mounting point of the main leg is attached at or adjacent to a pivot of the four-bar linkage,
 wherein one of the upper front pivot and the upper rear pivot pivotably attaches the main leg to the upper link of the four-bar linkage, and the landing gear further comprises an auxiliary link which extends between the main leg and the other of the upper front pivot and the upper rear pivot.

15. The aircraft landing gear according to claim 9, wherein the shock absorber extends between a proximal mounting point attached to the main leg and a distal mounting point attached to the four-bar linkage.

16. The aircraft landing gear according to claim 15, wherein the distal mounting point of the shock absorber is attached at or adjacent to a pivot of the four-bar linkage.

17. The aircraft landing gear according to claim 16, wherein the distal mounting point of the shock absorber is pivotably attached to the four-bar linkage.

18. An aircraft comprising:
the aircraft landing gear according to claim 1.

19. The aircraft according to claim 18, wherein the shock absorber defines a longitudinal axis, and when in the deployed configuration the aircraft landing gear is arranged to prevent the longitudinal axis of the shock absorber from reaching an angle of less than 75 degrees relative to a plane containing a pitch axis of the aircraft and a roll axis of the aircraft.

20. An aircraft landing gear comprising:
a suspension mechanism which comprises a biasing member and a linkage, the linkage comprising four rigid, elongate members connected to one another by pivots to form a quadrilateral with one of said pivots in each corner, wherein one of said rigid, elongate members forms a bottom of the quadrilateral and has a forward wheel mounting point and a rearward wheel mounting point, wherein one of said rigid, elongate members forms a top of the quadrilateral, wherein the suspension mechanism has a tall configuration and a short configuration, the rigid, elongate members forming the top and bottom of the quadrilateral being closer together when the suspension mechanism is in the short configuration than when the suspension mechanism is in the tall configuration, wherein the biasing member biases the suspension mechanism towards the tall configuration, and wherein the rigid elongate member forming the top of the quadrilateral is configured to be adjusted in length so as to change a distance between two of said pivots.

\* \* \* \* \*